United States Patent
Maruyama et al.

(10) Patent No.: US 8,437,102 B2
(45) Date of Patent: May 7, 2013

(54) PERPENDICULAR MAGNETIC HEAD WITH SIDE SHIELD DEPTH LESS THAN WRITE GAP FILM

(75) Inventors: Yoji Maruyama, Saitama (JP); Takayuki Iwakura, Kanagawa (JP); Ichiro Ohdake, Kanagawa (JP); Masafumi Mochizuku, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 444 days.

(21) Appl. No.: 11/591,296

(22) Filed: Oct. 31, 2006

(65) Prior Publication Data

US 2007/0146929 A1    Jun. 28, 2007

(30) Foreign Application Priority Data

Nov. 2, 2005    (JP) .................................. 2005-318943

(51) Int. Cl.
G11B 5/31 (2006.01)
G11B 5/10 (2006.01)
G11B 5/17 (2006.01)
G11B 5/23 (2006.01)
G11B 5/39 (2006.01)

(52) U.S. Cl.
USPC .............. 360/125.3; 360/123.06; 360/123.11; 360/119.04; 360/317

(58) Field of Classification Search ............. 360/123.06, 360/123.1, 123.11, 123.17, 123.38, 123.39, 360/123.4, 123.41, 123.42, 123.56, 123.57, 360/125.1, 125.14, 125.3, 125.47, 125.52, 360/125.6, 125.65, 317, 119.02, 119.04
See application file for complete search history.

(56) References Cited

U.S. PATENT DOCUMENTS

| | | | |
|---|---|---|---|
| 5,801,910 A * | 9/1998 | Mallary ................... | 360/125.65 |
| 6,525,904 B1 * | 2/2003 | Sasaki ...................... | 360/125.65 |
| 6,710,972 B1 | 3/2004 | Mochizuki et al. | |
| 6,754,049 B1 * | 6/2004 | Seagle et al. ................. | 360/317 |
| 7,126,788 B1 * | 10/2006 | Liu et al. .................. | 360/125.53 |
| 7,126,790 B1 * | 10/2006 | Liu et al. .................. | 360/125.53 |
| 7,193,815 B1 * | 3/2007 | Stoev et al. ................ | 360/125.3 |
| 7,199,975 B1 * | 4/2007 | Pan .......................... | 360/125.06 |
| 7,372,664 B1 * | 5/2008 | Mallary et al. ........... | 360/123.02 |
| 7,508,624 B1 * | 3/2009 | Lauer ...................... | 360/125.15 |
| 2002/0105756 A1 * | 8/2002 | Sasaki ...................... | 360/123.47 |
| 2002/0176214 A1 * | 11/2002 | Shukh et al. .............. | 360/125.3 |
| 2005/0057852 A1 | 3/2005 | Yazawa et al. | |
| 2005/0068678 A1 * | 3/2005 | Hsu et al. .................. | 360/125.3 |
| 2005/0141137 A1 | 6/2005 | Okada et al. | |
| 2006/0198049 A1 * | 9/2006 | Sasaki et al. ............. | 360/125.09 |
| 2006/0268456 A1 * | 11/2006 | Sasaki et al. ............. | 360/125.12 |
| 2007/0121248 A1 * | 5/2007 | Sasaki et al. ............. | 360/123.56 |
| 2007/0211377 A1 * | 9/2007 | Sasaki et al. ............. | 360/125.3 |
| 2007/0291409 A1 * | 12/2007 | Sasaki et al. ............. | 360/125.02 |

FOREIGN PATENT DOCUMENTS

JP    2001-250204 A    9/2001

* cited by examiner

*Primary Examiner* — Craig A. Renner
(74) *Attorney, Agent, or Firm* — Guadalupe M. Garcia

(57) ABSTRACT

Embodiments in accordance with the present invention provide a magnetic head having a narrow track width and excellent in productivity for the purpose of realizing a disk storage unit having a large capacity. In a magnetic head having a plurality of flairs on a main magnetic pole, a side shield is formed via a non-magnetic film on both sides of the flair disposed close to an air bearing surface in such a fashion as to be aligned with the flair.

8 Claims, 9 Drawing Sheets

(a)

(b)

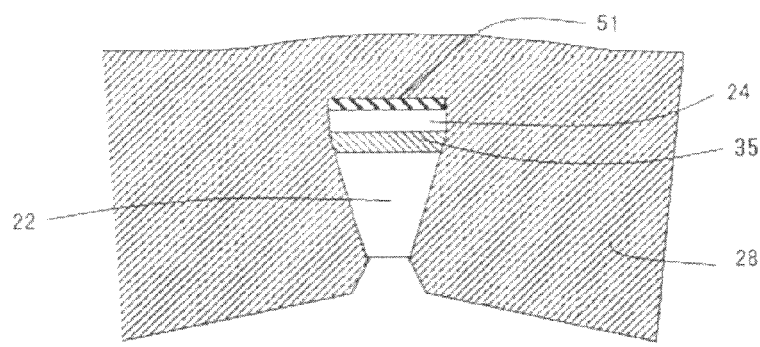
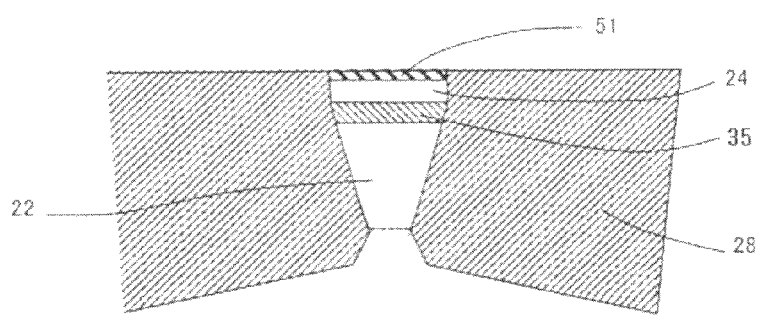
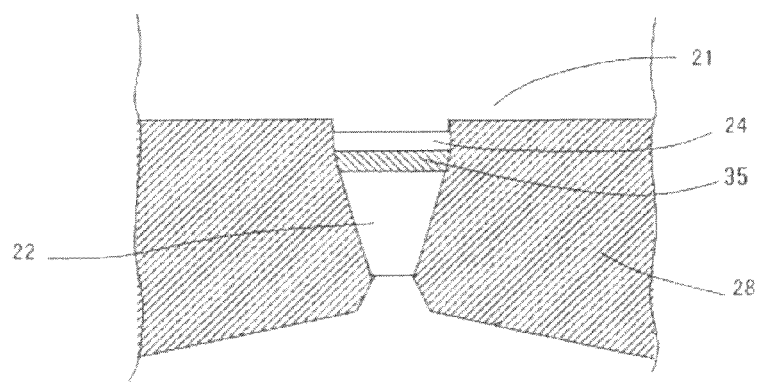

PERPENDICULAR MAGNETIC HEAD WITH SIDE SHIELD DEPTH LESS THAN WRITE GAP FILM

CROSS-REFERENCES TO RELATED APPLICATIONS

The instant nonprovisional patent application claims priority to Japanese Patent Application No. 2005-318943, filed Nov. 2, 2005 and incorporated by reference herein for all purposes.

BACKGROUND OF THE INVENTION

Embodiments in accordance with the present invention relate to a magnetic head for a disk storage unit using a perpendicular magnetic recording method, particularly, to a write magnetic head structure suitable for recording high density magnetic information on a medium surface and a production method thereof.

A semiconductor memory and a magnetic memory are mainly used for a storage (recording) device of an information appliance. The semiconductor memory is used for an internal storage from the standpoint of access time, and the disk storage unit is used for an external storage from the standpoint of large capacity and nonvolatile properties. A storage capacity is an important index for indicating performance of the disk storage unit, and a smaller disk storage unit having a large capacity is demanded in the market along with recent development of information society. One of recording methods suitable for such demand is a perpendicular recording method. Since this method enables high density, it is considered that the method will become the mainstream method in place of the longitudinal recording method.

[Patent Publication 1] JP-A-2005-92929
[Patent Publication 2] JP-A-2005-190518
[Patent Publication 3] JP-A-2001-250204
[Patent Publication 4] JP-A-2004-164783

Patent Publication 1 discloses an integral shield layer 77 formed over an upper part of a main magnetic pole and both sides of the main magnetic pole and an auxiliary magnetic pole 34 which is connected to a yoke and formed on the shield layer 77. A magnetic path is formed by the auxiliary magnetic pole 34, the yoke 31, and the main magnetic pole 30. A flair is formed on the main magnetic pole 30. A thickness of the shield layer 77 is decided depending on a resist layer R2.

Patent Publication 2 discloses a magnetic head for perpendicular recording which has a main magnetic pole whose width is widened with respect to a trailing side and narrowed with respect to a reading side and is provided with a trailing side shield. A flair is formed on the main magnetic pole, and a thickness of the trailing side shield is controlled by a resist frame pattern 23. It is disclosed that it is necessary to keep the thickness of the trailing shield to a throw height or less since a magnetic field is leaked from the flair portion to the trailing shield when the trailing shield is close to a flair point of the main magnetic pole.

Patent Publication 3 discloses a magnetic write head having a conductor coil disposed in such a fashion as to sandwich a main magnetic pole thin film from two thickness directions of the main magnetic pole thin film, wherein whole parts of the main magnetic pole and the conductor coil are enclosed by a soft magnetic thin film also serving as a magnetic shield.

Patent Publication 4 discloses a structure for reducing a magnetic flux density in a backing layer by preventing deterioration in recording magnetic field strength by the use of asymmetric magnetomotive forces for exciting a main magnetic pole through provision of an excitation coils different in magnetomotive force on both side of the main magnetic pole in such a fashion as to sandwich the main magnetic pole.

As a result of study conducted by the inventors, the following problems are detected. Since an orientation of magnetization of a recording medium of the perpendicular recording method is in a perpendicular direction with respect to a surface of the medium, a degree of influence of a demagnetizing field to be exerted between adjacent magnetic domains is lower as compared with that of the longitudinal recording method. Accordingly, it is possible to write high density magnetic information on the medium and to form a large capacity magnetic disk; however, it is necessary to control a length in a depth direction of the soft magnetic film (shield used for achieving a steep magnetic field gradient) disposed close to the main magnetic pole to be short with high accuracy. In order to generate a ferromagnetic field, it is necessary to control the flair point of the main magnetic pole with high accuracy. Further, since a recording magnetic field is reduced by a large scale when the length in the depth direction of the soft magnetic film contacting both sides of the main magnetic pole, it is necessary to accurately control formation precision (film thickness, length in depth direction) of the members in order to achieve the desired steep magnetic field gradient. More specifically, it is required that the length in the depth direction of the soft magnetic film (shield used for achieving steep magnetic field gradient) disposed close to the main magnetic pole and the flair point of the main magnetic pole have the sizes of from 50 to 200 nm, which are very small, and a manufacturing error is about □ 10 nm, which is of remarkably high accuracy. Though the thickness of the auxiliary magnetic pole is controlled with the use of the resist in Patent Publication 1, positioning is difficult in actuality. Therefore, in the case of producing the perpendicular head by a commercially available semiconductor production apparatus, a production yield is low, and it has been difficult to produce cheap heads in a sufficiently large amount.

Also, a technology of disposing a two-layer coil on both sides of the main magnetic pole is effective for generating a strong recording magnetic field. In this case, too, it is necessary to control the length in the depth direction of the soft magnetic film disposed close to the main magnetic pole and the position of the flair point of the main magnetic pole. Since it is also important to perform heat reduction in the constitution of disposing the two-layer coil on both sides of the main magnetic pole, it is necessary to take the shape of the coil into consideration.

An object of this invention is to provide a magnetic head having a narrow track width and excellent in bulk production for the purpose of realizing a disk storage unit having large capacity and capable of high speed recording.

BRIEF SUMMARY OF THE INVENTION

Embodiments in accordance with the present invention provide a magnetic head having a narrow track width and excellent in productivity for the purpose of realizing a disk storage unit having a large capacity. In a magnetic head having a plurality of flairs on a main magnetic pole, a side shield is formed via a non-magnetic film on both sides of the flair disposed close to an air bearing surface in such a fashion as to be aligned with the flair.

BRIEF DESCRIPTION OF THE DRAWINGS

FIG. 16 is a diagram showing a production process of the magnetic head of Embodiment 4.

FIG. 17 is a diagram showing a production process of the magnetic head of Embodiment 4.

FIG. 18 is a diagram showing a production process of the magnetic head of Embodiment 4.

DETAILED DESCRIPTION OF THE INVENTION

A summary of representative examples of this invention disclosed in this patent application will be briefly described below.

A magnetic head comprising: a main magnetic pole provided with a first flair and a second flair; a sub magnetic pole; a first coil conductor formed between a layer on which the main magnetic pole is formed and a layer on which the sub magnetic pole is formed; and a first magnetic film disposed via a first non-magnetic layer on side faces of the main magnetic pole, wherein a first gap between an air bearing surface and the first flair is larger than a second gap between the air bearing surface and the second flair, and the first non-magnetic layer is formed along the second flair.

As a production method, after depositing a first magnetic film, a first non-magnetic film is formed above the first magnetic film, followed by forming a resist above the first non-magnetic film in a region recessed from an air bearing surface. After performing milling for narrowing a width in a track width direction of the first magnetic film by using the resist as a mask, a second non-magnetic film is formed, followed by depositing a second magnetic film above the second non-magnetic film. After performing a planarizing processing, a part of the second magnetic film and the second non-magnetic film is removed, followed by forming a first coil conductor and a first insulating film for covering the first coil conductor. A third magnetic film is formed above the first insulating film and the first non-magnetic film.

As another embodiment, a coil conductor is provided on both sides of a main magnetic pole in a film thickness direction, and keeping a film thickness of the coil conductor formed below the main magnetic pole smaller than that of the coil conductor formed above the main magnetic pole.

Since the side shield is provided on the side faces of the main magnetic pole in the self-aligning manner, it is possible to simultaneously (in one process) set the flair point position and the length in the depth direction of the soft magnetic film that influence most greatly on the recording magnetic field. Accordingly, it is possible to realize a magnetic head with high process reliability to improve production yield.

Also, by changing the shape of the upper coil conductor from that of the lower coil conductor in the mode of providing the coil conductors above and below the main magnetic pole, it is possible to improve the heat reduction.

Figure 2:
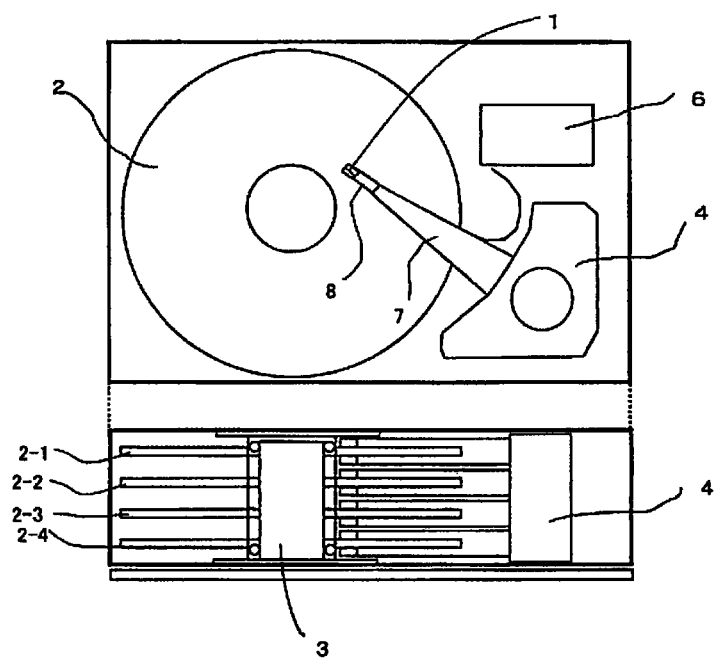
FIG. 2 is a conceptual diagram showing a disk storage unit using the magnetic had according to this embodiment.

FIG. 2 is a diagram showing a basic constitution of a disk storage unit employing a perpendicular recording method. A diagram shown in an upper part of FIG. 2 is a plan view of the unit, and a diagram shown in a lower part of FIG. 2 is a sectional view of the unit. A recording medium 2 (a plurality of mediums 2-1 to 2-4 may be used in actuality) is directly connected to a motor 3 and has a function of rotating at the time of information input/output. A magnetic head 1 is supported by a rotary actuator 4 via an arm 7. A suspension 8 has a function of retaining the magnetic head 1 on the recording medium 2 with a predetermined force. A signal processing circuit and a read/write circuit 6 are required for reproduction signal processing and information input/output, and the circuits are mounted on a main body of the unit. Since a reproduction waveform (amplification change of reproduction signal with respect to a time axis) obtained by the perpendicular magnetic recording method is trapezoidal waveform which is different from the Lorentz waveform observed in a longitudinal recording method, the signal processing circuit and a waveform equivalent circuit are different from those of an in-plane magnetic recording method. In the perpendicular recording method, the medium having an axis of easy magnetization in a direction perpendicular to a recording surface is used. A glass or Al substrate is used for the recording medium 2 of the disk storage unit. A magnetic thin film is formed on the substrate for forming a recording layer. A recording magnetic field from the main magnetic pole acts on the recording medium to reverse the magnetization of the recording layer. Since it is necessary to perform the recording in the perpendicular magnetic recording by using the magnetic field component in the perpendicular direction, a lower soft underlayer (SUL) is provided between the recording layer and the substrate.

A function unit (write function unit) having an electromagnetic conversion effect is used for writing magnetic information on the recording mediums. A function unit (read function unit) using a magnetoresistive phenomenon, a giant magnetoresistive phenomenon, or an electromagnetic induction phenomenon is used for reading the magnetic information. The function units are provided on an input/output component called magnetic head. The magnetic head 1 moves on the surface of the recording medium 2 by the rotation of the rotary actuator 4 to be positioned at an arbitrary position and then realizes the magnetic information read/write function. An electrical circuit for controlling this operation is included in the signal processing circuit 6.

Figure 1:
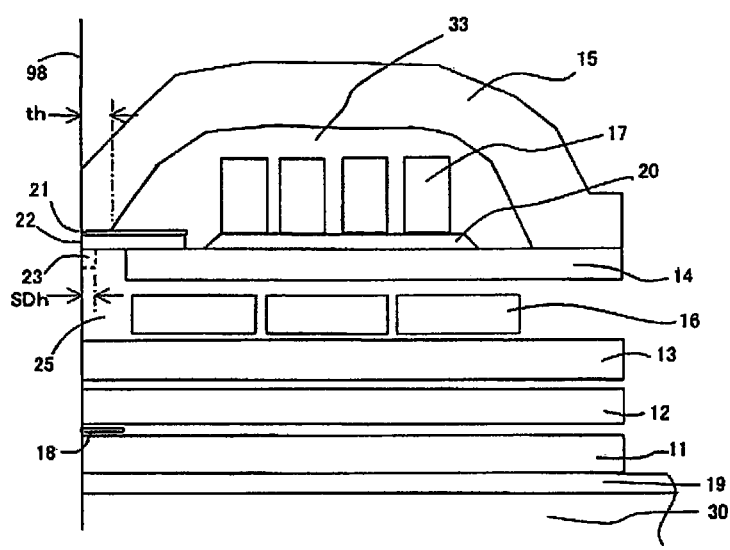
FIG. 1 is a conceptual diagram showing a section of a magnetic head of Embodiment 1.

Structures of the information write function unit and the information read function unit mounted above the magnetic head 1 will be described. FIG. 1 is a sectional view showing an element, which is taken along the center of a main magnetic pole 22 and perpendicular to an air bearing surface 98. Shown in FIG. 1 is a section of the air bearing surface 98 taken along a height direction in the central line of the main magnetic pole 22. The element has a structure that the read function unit and the write function unit are stacked in this order above an underlayer 19 above a substrate 30 of a slider member.

The read function unit has a lower shield 11, an upper shield 12, and a magnetoresistive element 18 surrounded by the upper and lower shields, a part of the magnetoresistive element 18 being exposed to the air bearing surface. An electrode connected to the magnetoresistive element 18 has a function of transmitting electrical information from the read function unit to a signal processing circuit. As the magnetoresistive element 18, a CPP (Current Perpendicular to Plane) element, a giant magnetoresistive element (GMR), or the like may be used. As a read shield, a permalloy made from NiFe containing more than 80% of Ni is used.

The slider member 30 used as the substrate in an element production step is made from Al2O3-TiC (carbide aluminatitanate). A shield member, a magnetoresistive element, and the like are separated by Al2O3 (alumina) or the like which is a non-magnetic and insulating material (or material remarkably high in electrical resistance).

The write function unit is basically formed of a soft magnetic film pattern 14 sandwiched between a lower coil 16 and an upper coil 17, a magnetic layer connected to the soft magnetic film pattern 14 and forming the magnetic pole 22 for writing on the medium, a magnetic film 13 (having another function as a shield for reducing influence of a magnetic field exerted by the lower coil 16 on the read unit) for returning a magnetic flux from the medium, and a magnetic film 15. The magnetic film 15 is magnetically coupled to soft magnetic film pattern 23. The magnetic film 23 is a part of a side shield formed on side faces of the main magnetic pole. In view of the process (milling step for forming an lonely inverted trapezoid shape of the main magnetic pole), the part is formed below the main magnetic pole. The magnetic film 23 is indicated by a dotted line since it is seen through an insulating film 25.

The spliced body formed of the soft magnetic film pattern 23 and the magnetic film 15 occupies a wide area on the air bearing surface 98, and, particularly, the soft magnetic film pattern 23 is thin in a depth direction. Such structure is for the purposes of reducing a magnetic flux distribution in the magnetic film 23 during recording (the wide area) and reducing a magnetic flux directly leaked from the main magnetic pole 22 (the thin structure).

The magnetic layer forming the magnetic pole 22 for writing on the medium is exposed to the air bearing surface and basically has the main magnetic pole 22 for defining a recording track width and the shield 15 provided on a trailing side (fluxion end side) of the main magnetic pole 22. A rear end of the main magnetic pole 22 is connected to the soft magnetic film pattern 14 to form a back gap at a rear end of the soft magnetic film pattern 14. More specifically, the main magnetic pole 22 is magnetically coupled to the magnetic film 15. Also, a length SDh in the depth direction of the soft magnetic film pattern 23 is made shorter than a length th in the height direction of a contact of the magnetic film 15 to the nonmagnetic film 21. Particularly, by keeping the length SDh to 150 nm or less, it is possible to suppress a remarkable reduction in recording magnetic field. An amount of the magnetic flux leaked to the magnetic film from the main magnetic pole is increased when the magnetic film approaches on a surface on which the width of the main magnetic pole is narrowed, while such influence is diminished on the surface on which no change occurs in the film thickness direction as compared to the above described example. It is ideal to form the soft magnetic film pattern 23 having the short SDh and the magnetic film 15 from different magnetic films (to form the films in different process steps) in view of achieving a certain accuracy of the thickness SDh on the air bearing surface side of the magnetic film. However, in order to perform such process steps, it is necessary to perform a CMP processing after the process step of forming the upper coil 17 and the insulating film 33 above the upper coil 17, thereby complicating the process. However, a considerable merit is achieved by simultaneously forming the trailing shield requiring the wide area and the connection layer for the rear end portion by the film that does not require accuracy. Also, in view of the fact that an excellent high frequency characteristic is achieved by rounding a path of the magnetic flux, the magnetic film 15 is curved.

In order to form the coil 17 between the soft magnetic film pattern 14 and the magnetic film 15 as well as to ensure an electrical insulation between the coil 17 and the magnetic film 14, an insulating layer 20 is provided. Also, in order to ensure electrical insulation between the coil 17 and the soft magnetic film pattern 15, an insulating layer 33 is filled therebetween. The alumina film used for the lower part 25 of the main magnetic pole 22 is used for this insulation film.

The lower coil 16 is electrically and magnetically insulated from the soft magnetic film pattern 14 by an insulating film 25. A sectional shape of the lower coil is flat for the purpose of mitigating the problem that the air bearing surface 98 is projected due to heat expansion of the coil member due to an increase in ambient temperature, and a sectional area thereof is widened as compared to the upper coil in order to achieve a low electrical resistance. A pitch of the upper coil conductor 17 is narrowed as compared to that of the lower coil conductor 16. In this embodiment, the coil layers are formed above and below the main magnetic pole, and it is necessary to improve heat reduction in order to ensure properties of the main magnetic pole in this constitution. In this invention, a film thickness of the lower coil is made smaller than that of the upper coil, and a width of the lower coil is made larger than that of the upper coil, so that the heat is prevented from transmitting to the main magnetic pole. The lower coil conductor 16 is disposed outside a closed magnetic path enclosing the upper coil conductor 17, and the upper coil 17 and the lower coil conductor 16 is serially connected to a common power source. Thus, since it is possible to supply currents having an identical current amplification and an identical phase to the upper coil conductor 17 and the lower coil conductor 16, it is possible to form a driving system of the coils at a reduced cost without the necessity for using separate current supply sources for the coils.

Also, magnetic fields generated by the coil conductors are in a differential relationship. In this embodiment, the two layers of spiral coils are considered, and the differential relationship aimed in this patent is equivalent for a structure of winding a coil in a Helical fashion (a structure wherein a coil is wound around a main magnetic pole). Though the production process is complicated, it is possible to apply this invention to the Helical coil structure without limitation to the two layers of differential winding coils.

Figure 3:
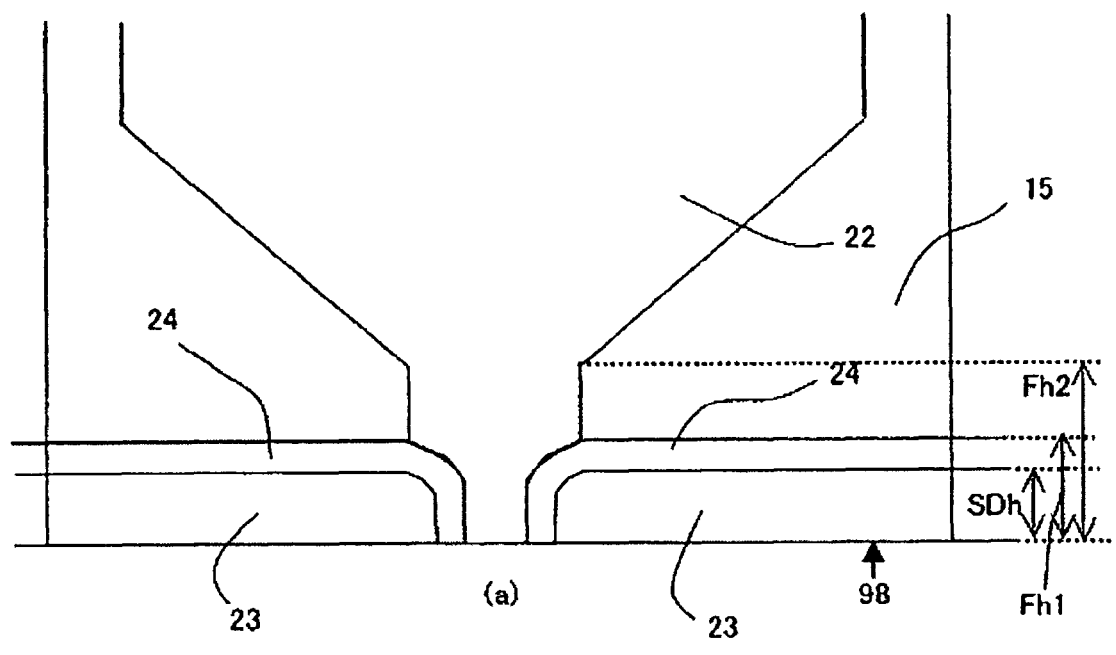
FIG. 3 is a diagram showing a major part of the magnetic head of Embodiment 1.
Figure 3:
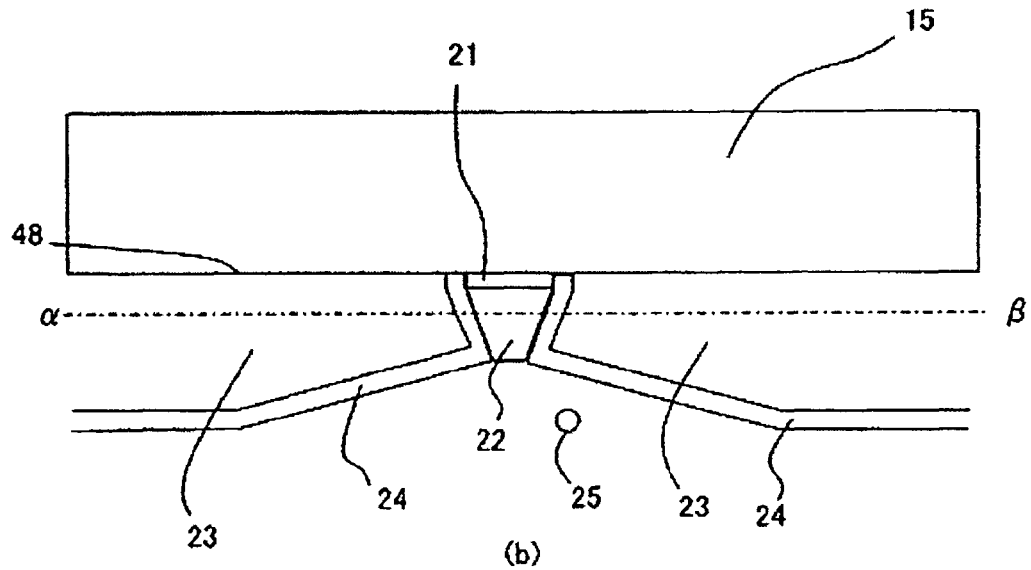

Hereinafter, characteristics of embodiments in accordance with this invention will be described by using an enlarged view of FIG. 3. FIG. 3(a) is a sectional view taken along a plane penetrating a film thickness center of the main magnetic pole (FIG. 3(b), line α-β) and perpendicular to the air bearing surface 98, and FIG. 3(b) is a diagram showing the shape of the air baring surface. In order to indicate the relationship with the second soft magnetic film 15, the shape of the second soft magnetic film 15 as viewed from the trailing side of the film is also shown in FIG. 3(b). A plurality of flairs (structure of narrowing a magnetic pole width toward the air bearing surface 98) are formed above the main magnetic pole 22, and the second non-magnetic film 24 contacts the flair disposed closest to the air baring surface. The second non-magnetic film further contacts the first soft magnetic film 23. The first soft magnetic film is enclosed by the non-magnetic film 24 from at least three directions. A length in a depth direction of the first soft magnetic film is decided by the second non-magnetic film 24. A length Fh1 of the first flair in the depth direction is less than a length Fh2 in the depth direction of the second flair and is equal to a sum of the thickness Sdh of the first soft magnetic film 23 in the depth direction and a thickness in the depth direction of the non-magnetic film. A length th in a height direction in which the second magnetic film 15 contacts the non-magnetic film 21 is not shown in FIG. 3, but the length th is larger than the length SDh of the first flair in the depth direction and shorter than the length Fh2 of the second flair in the depth direction.

The main magnetic pole 22 is provided above the filling layer 25 made from alumina which is non-magnetic. The first non-magnetic film 21 is disposed above the trailing side of the main magnetic pole 22. The second soft magnetic film 15 is disposed in such a fashion as to contact the first non-magnetic layer 21. The second non-magnetic layer 24 is disposed above both sides of the main magnetic pole 22. The first soft magnetic film 23 contacts the second soft magnetic film 15. The first non-magnetic film 24 contacts the first soft magnetic film 23. A contact surface 48 is flattened by chemical mechanical polishing (CMP). The thickness of the first non-magnetic film 21 deciding the gap between the magnetic film 15 and the main magnetic pole 22 is about 50 nm which is smaller than the gap between the sub magnetic pole 13 and the main magnetic pole 22. This is because the writing on the medium is performed on the end on the trailing side of the main magnetic pole, and because the gap of the first magnetic film 21 is narrowed to supply the magnetic flux from the main magnetic pole to the magnetic film 15 via the non-magnetic film 21, thereby achieving a steep magnetic field distribution (magnetic field gradient).

The magnetic film 15 has a width in a track width direction which is larger than the maximum width of the main magnetic pole positioned distant from the air bearing surface and is similar to that of the sub magnetic pole 25 in the film thickness direction on the air bearing surface. Thus, the magnetic film 15 performs the role of a trailing shield on the air bearing surface.

With such constitution, it is possible to obtain magnetic heads having the desired recording properties at a high yield.

Hereinafter, the reasons for the above will be described in detail.

Since the width of the main magnetic pole 22 exposed to the air bearing surface decides the recording track width, it is necessary to form the main magnetic pole 22 having the predetermined width which is remarkably narrow in order to achieve the high density recording. It is difficult to achieve a sufficient recording magnetic field strength when the narrow track width region is elongated in a direction departing from the air bearing surface. Therefore, a geometric restriction shape called flair is formed at a position recessed from the air bearing surface. This flair point is remarkably high in sensitivity to the recording magnetic field as is apparent from the above-described object, and high accuracy of the flair point is in demand.

The first soft magnetic film 23 has a function of shielding the magnetic field in order to prevent the strong recording magnetic field from the main magnetic pole 22 from influencing (leaking) on the adjacent track. From this function, in the case where the thickness of the soft magnetic film 23 as viewed from the air baring surface is large (length in depth direction is long), a proportion of the magnetic field leaking from the main magnetic pole 22 to the soft magnetic film 23 is increased to reduce the recording magnetic field.

It is possible to largely reduce the change in recording magnetic field strength due to a production fluctuation by simultaneously controlling the factors influencing on the recording magnetic field, i.e. the positions of the flair point and the soft magnetic film 23.

In this structure, the first non-magnetic film 21 is disposed above the trailing side of the main magnetic pole 22, and the second soft magnetic film 15 is provided above the non-magnetic film 21, and the first soft magnetic film is magnetically coupled to the trailing side. The second soft magnetic film 15 contributes to achieving the steep magnetic field gradient on the trailing side thanks to the effect of shielding the surplus magnetic field spreading on the trailing side of the main magnetic pole 22, and the soft magnetic film 23 has a function of shielding an unnecessary magnetic field leaked to both sides of the main magnetic pole 22. It is possible to achieve a high leaner density recording and a high tracking density thanks to the effects.

Hereinafter, a production method of this embodiment will be described. To start with, the read unit is formed above the substrate 30 made from alumina titan carbon Al2O3-TiC or the like. The read unit is formed by forming, above the substrate 30, the under layer 19, the first shield 11, the magnetoresistive element 18, and the second shield 11 in this order. After forming the read unit, the insulating film is formed, and then the recording unit is formed. A production process of the recording unit will be described in detail. The sub magnetic pole 13 for receiving the magnetic field from the main magnetic pole via the soft magnetic layer of the perpendicular recording medium is formed by forming a soft magnetic film by plating after forming a resist frame or by depositing a soft magnetic film by sputtering via a non-magnetic insulating film above the second shield 12. The coil underlayer and the coil 16 are then formed. The insulating film 22 made from alumina or the like for covering the coil conductor is stacked, and then a planarizing processing such as CMP is performed on surface thereof. The magnetic film to be used as the auxiliary magnetic pole layer for transmitting the magnetic flux efficiently to the main magnetic pole is formed on the polished plane by plating or sputtering, and then an insulating film is formed, followed by a planarizing processing such as CMP.

An element production method after the main magnetic pole formation step of this embodiment will be described in detail by using FIGS. 6 to 11.

Figure 6:
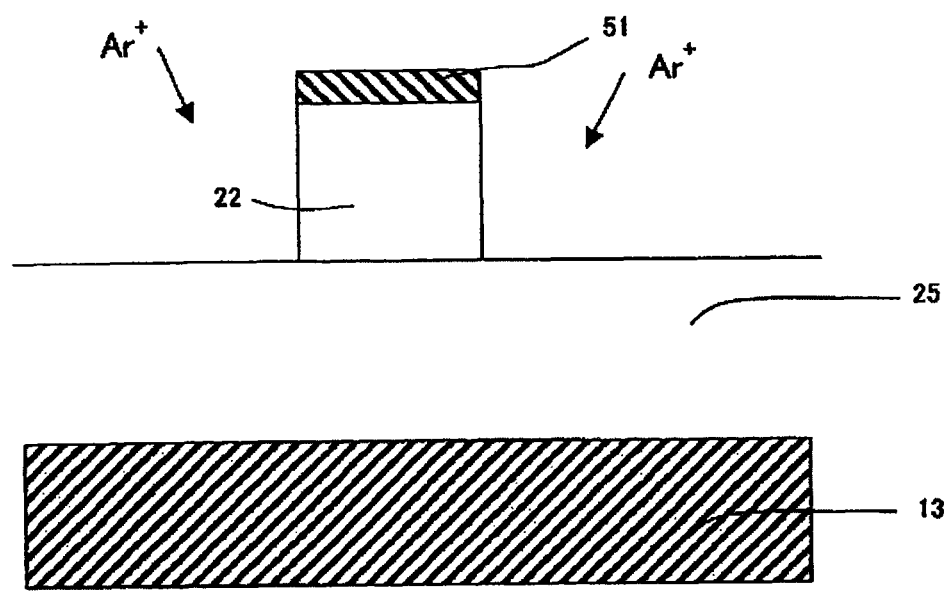
FIG. 6 is a diagram showing a production process of the magnetic head of Embodiment 1.
Figure 7:
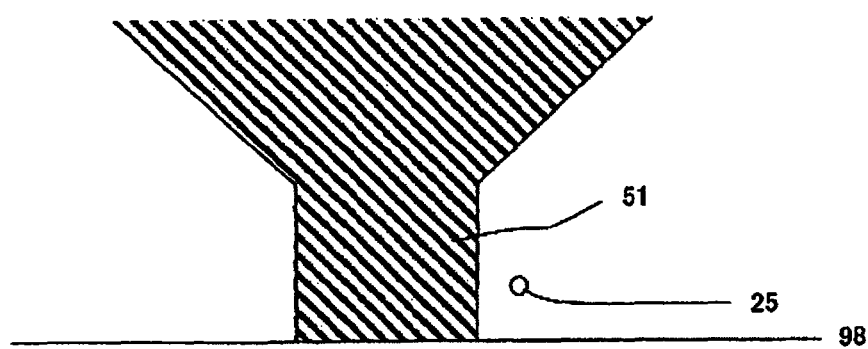
FIG. 7 is a diagram showing a production process of the magnetic head of Embodiment 1.

FIG. 6 is a diagram showing a state achieved by disposing (depositing) the main magnetic pole material by sputtering after forming the insulating film 25, and then etching the main magnetic pole 22 by using an alumina film 51 formed by hot lithography as a mask. accelerated Ar ions are used for the etching. FIG. 7 is a diagram showing a state in which the above-described state is viewed from a direction of an upper part of the drawing sheet. The flair shape is transcribed on the alumina 51, and the main magnetic pole is formed in accordance with the transcribed flair shape.

Figure 8:
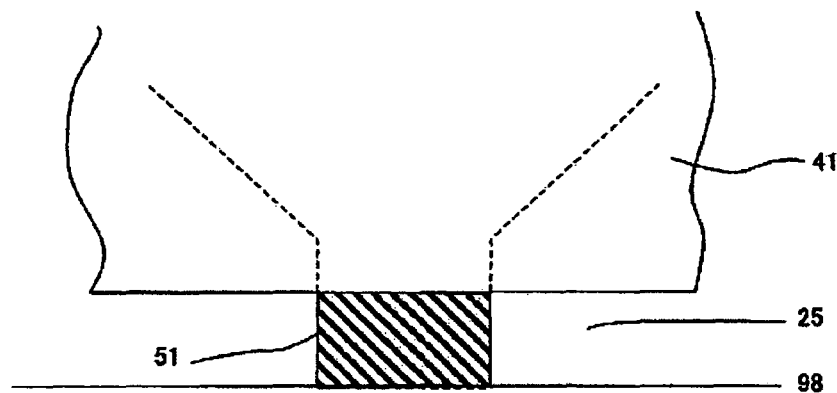
FIG. 8 is a diagram showing a production process of the magnetic head of Embodiment 1.
Figure 9:
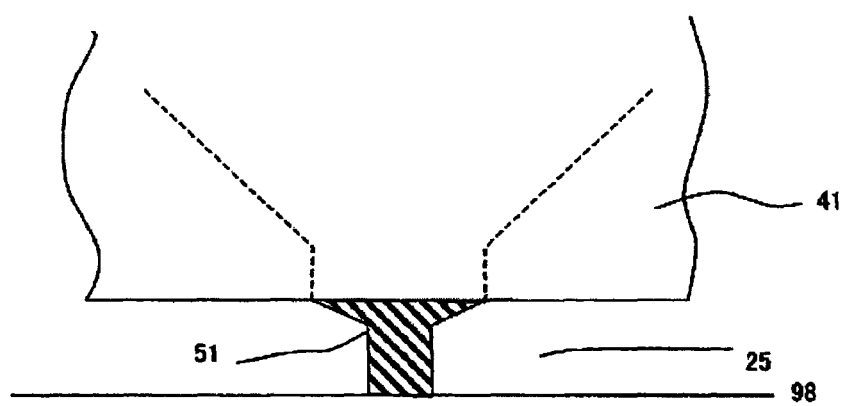
FIG. 9 is a diagram showing a production process of the magnetic head of Embodiment 1.
Figure 10:
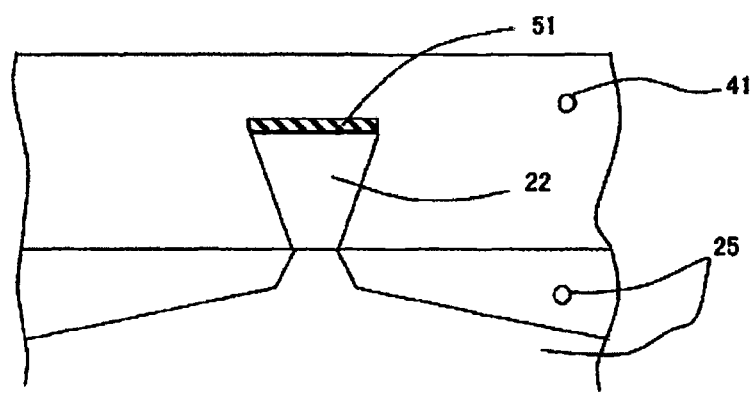
FIG. 10 is a diagram showing a production process of the magnetic head of Embodiment 1.

After that, the resist film 41 is selectively deposited on the rear end portion of the flair as shown in FIG. 8. Then, etching is performed on the tip of the main magnetic pole in a direction of narrowing the track width as shown in FIG. 9 by using the resist film 41 as a mask. The accelerated Ar ions are also used for this etching. By injecting the Ar ions particularly from an oblique direction, the sectional shape of the main magnetic pole 22 becomes anti-trapezoidal shape as shown in FIG. 10. By this etching, the track width of a part of the main magnetic pole 22 in the region exposed from the resist film 41 is narrowed, so that the new flair which is closer to the air bearing surface side as shown in FIG. 9 is formed. In order to properly set a ratio between the depth of the flair close to the air bearing surface and the track width, the ion etching is performed from an oblique angle while rotating the wafer in a horizontal direction. Also, as shown in FIG. 10, the etching proceeds to a part of the insulating layer 25 and the alumina film 51 when the previous etching is terminated. In order to obtain the track width with high accuracy, it is important to protect the main magnetic pole by leaving the alumina film 51 at the time point when the etching is terminated.

Therefore, it is possible to leave the alumina film 51 having a desired film thickness by controlling an etching time and a deposition film thickness of the alumina film 51. Though the alumina film 51 is used as the first non-magnetic film in this embodiment, an alumina film obtained by forming a new first non-magnetic film may be used. The state shown in FIG. 11 (schematically showing a state in which the main magnetic pole is cut on a virtual air bearing surface position) is achieved by forming the new flair on the air bearing surface side of the main magnetic pole 22 and adhering (depositing) the alumina film 24 serving as the second non-magnetic film in the state where the first non-magnetic film is present on the new flair (in the case of depositing the new first non-magnetic film, the film remains on both sides of the main magnetic pole) by CVD (Chemical Vapor Deposition) or PVD (Physical Vapor Deposition) all over the wafer.

Figure 12:
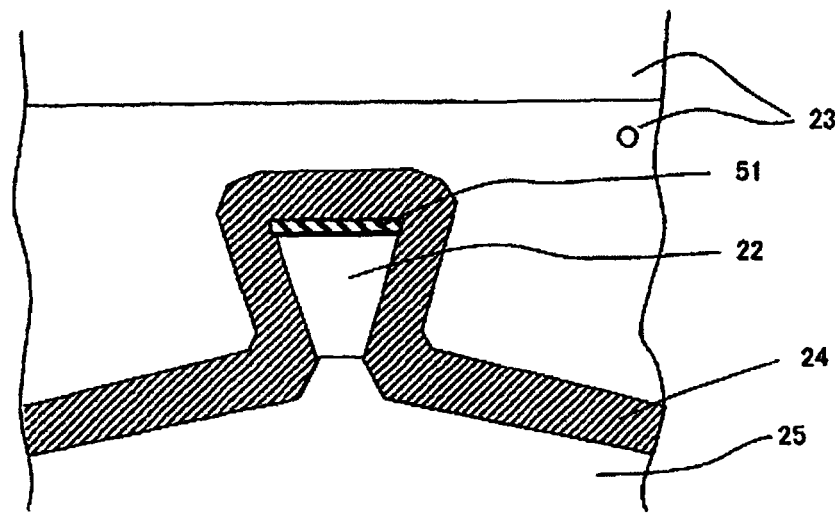
FIG. 12 is a diagram showing a production process of the magnetic head of Embodiment 1.
Figure 13:
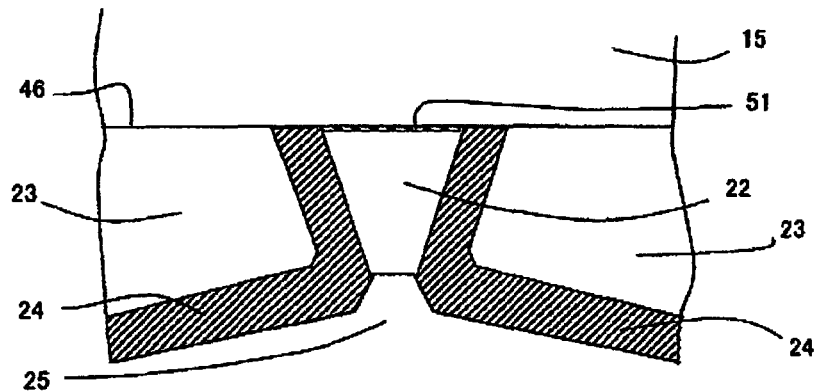
FIG. 13 is a diagram showing a production process of the magnetic head of Embodiment 1.

Further, as shown in FIG. 12, the soft magnetic film 23 is deposited (stacked) all over the wafer by sputtering. By this processing, the main magnetic pole 22 is buried under the soft magnetic film. After that, as shown in FIG. 13, the soft magnetic film 23 is selectively removed by the CMP processing. By using a point at which the CMP processing is terminated as the surface of the alumina film 51, it is possible to expose the alumina film 51, the second non-magnetic film 24, and the soft magnetic film 23 on an identical flat surface 46.

The termination point of the CMP processing is controlled in accordance with the exposure of the alumina film 51 as described above. It is needless to say that it is necessary to dispose the film on a wide area of the wafer without limitation on the upper part of the main magnetic pole in order to accurately control the termination point (the films having the same composition and the identical height in the film thickness direction). Also, in the case where the remaining thickness of the alumina film 51 is insufficient in the CMP processing, a new non-magnetic film may be formed on the upper part of the main magnetic pole. With such processing, it is possible to properly control the gap between the main magnetic pole 22 and the magnetic film 15, thereby determining the film thickness 51 of the first non-magnetic film.

The structure of this invention formed by the basic process described above is such that: the new flair is disposed on the air bearing surface side of the main magnetic pole; the non-magnetic layer is disposed along the new flair; and the length in the depth direction of the soft magnetic film disposed on both sides of the main magnetic pole is decided by the non-magnetic film. Due to this effect, the flair point position and the length in the depth direction of the soft magnetic film are simultaneously decided, and it is possible to realize magnetic heads reduced in difference in recording density otherwise caused by a production fluctuation.

After forming the magnetic film 23 serving as the side shield, a mask for covering the main magnetic pole and the non-magnetic film 21 is formed for forming the coil as in FIG. 1, and the alumina formed on the remaining region is eliminated by etching. Though the magnetic film 15 and the auxiliary magnetic pole 14 will not be in direct contact with each other, it is possible to omit the etching elimination step for the purpose of simplifying the processing. In this case, the insulating film below the coil and the part of the magnetic film 15 at which the magnetic film 15 contacts the auxiliary magnetic pole are formed on the non-magnetic film 21.

As in FIG. 1 the insulating layer 20 below the coil is formed on the region removed by the etching, and then the mask is removed. Then, the coil 17 of the upper part of the main magnetic pole is formed, followed by forming the insulating film 33 to cover the coil. By using a polymer resin such as a resist for the insulating film 33, it is possible to form the non-magnetic insulating film having projections by performing a heat treatment on the insulating film 33 at a temperature higher than the thermal flow temperature. Alternatively, the insulating film is stacked in a state where the region for connecting the side of the air bearing surface 98 to the auxiliary magnetic pole 14 is masked, and then the insulating film of the mask is removed by lift-off. This method is superior in deciding and controlling a boundary of the magnetic connection region with high reproducibility due to the omission of thermal flow. After that, the magnetic film 15 serving as the trailing shield and magnetically coupled to the auxiliary magnetic pole 14 at the rear end is formed by plating. The write function unit is formed by covering the protection film on the magnetic film 15. Further, after the fabrication of the slider such as forming grooves etc., bar-cutting is performed, and the air bearing surface is set by polishing.

Embodiment 2 of this invention is a modification of Embodiment 1. In the same manner as in FIG. 3(*a*), the flair is formed on the main magnetic pole 22, and the second non-magnetic film 24 contacts the flair. The second non-magnetic film 24 contacts also the first soft magnetic film 23. The first soft magnetic film 23 is enclosed by the second non-magnetic film 24 from at least two directions, and the length in the depth direction of the first soft magnetic film is decided by the second non-magnetic film 24.

Figure 4:
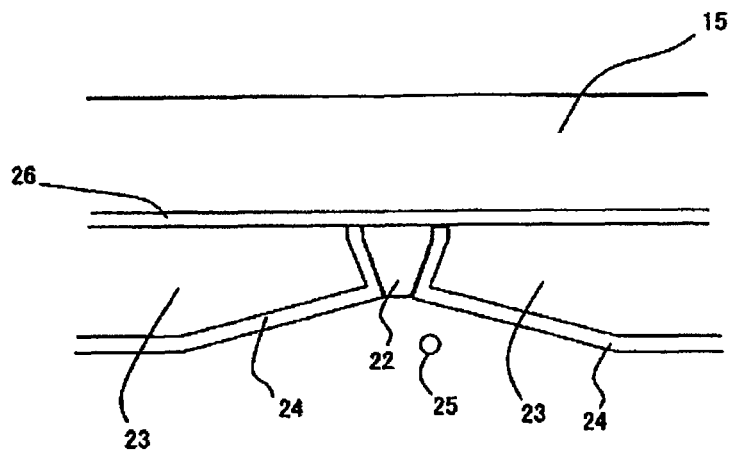
FIG. 4 is a diagram showing a major part of the magnetic head of Embodiment 2.

FIG. 4 is diagram showing the structure as viewed from the air bearing surface. A characteristic point is that the non-magnetic film 26 exists between the first soft magnetic film 23 and the second soft magnetic film 15. The second soft magnetic film 15 is magnetically coupled to the soft magnetic film pattern 14 at its rear end as shown in FIG. 1, but the first soft magnetic film 23 and the second soft magnetic film 15 are connected to each other via a magnetic resistance (non-magnetic film 26).

A characteristic effect of this structure is that the magnetic flux flowing from the first soft magnetic film 23 to the second soft magnetic film 15 via the non-magnetic film 26 is restricted. More specifically, the magnetic flux leaking from the main magnetic pole 22 is subject to a magnetoresistive action of the non-magnetic film 26, this structure is effective for suppressing an excessive magnetic flux leakage, and such effect enables generation of strong recording magnetic field from the main magnetic pole. Also, it is possible to generate a predetermined strong recording magnetic field in a state where the depth of the first soft magnetic film 23, i.e. the flair of the main magnetic pole, is elongated. The effect of using the longer flair enables to increase a tolerance of the flair in the element manufacturing process. Therefore, it is possible to realize magnetic heads reduced in difference of recording magnetic field otherwise caused by a production fluctuation in this embodiment, too.

An element production process of this structure is substantially the same as that shown in FIG. 6. It is possible to form modification points by depositing a non-magnetic film all over the wafer after the CMP processing and then forming the soft magnetic film 15. In this embodiment, the alumina film having a thickness of 1,000 angstroms is deposited after the CMP processing.

Embodiment 3 of this invention will be described by using FIGS. 14 and 15. The foregoing embodiments are production methods basically performed for remaining the first non-magnetic film above the trailing side of the main magnetic pole by planarizing processing such as CMP. Since the process margin is ensured in this method, it is possible to obtain the sufficient process margin by forming an auxiliary pattern, a pattern for monitoring an etching amount, and the like in the region other than the element unit. In this embodiment, a burden of the pattern to be formed above the region other than the element unit is considerably reduced. Therefore, this embodiment is characterized by previously forming the non-magnetic film to be remained on the main element unit.

Figure 11:
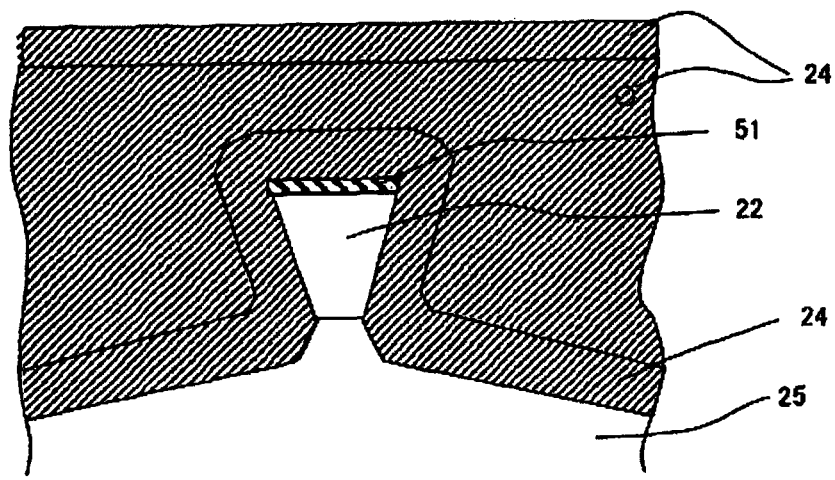
FIG. 11 is a conceptual diagram showing a section of a magnetic head of Embodiment 1.
Figure 15:
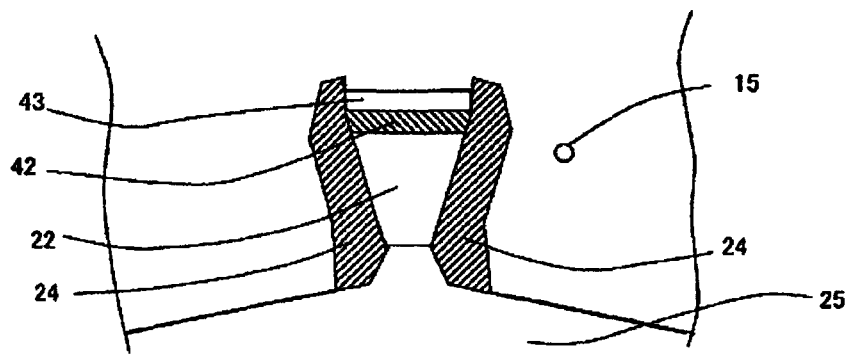
FIG. 15 is a diagram showing a production process of the magnetic head of Embodiment 3.

FIG. 15 is a diagram showing a state achieved by sequentially forming an alumina film to be used as a first non-magnetic film 42 and a soft magnetic film 43 above the main magnetic pole 22; etching the films simultaneously by using a mask material 51; depositing an alumina film to be use as the second non-magnetic film 24 as shown in FIG. 11; and removing the second non-magnetic film 24 deposited above a region other than the main magnetic pole with the use of accelerated Ar ions and using the mask material 51 as a mask again.

A Person skilled in the art will easily understand that the state is achieved by: depositing the alumina film to be used as the first non-magnetic film 42 and the soft magnetic film 43 above the main magnetic pole; depositing the alumina film to be used as the second non-magnetic film 24; and selectively removing the region that is thinner when viewed in the film thickness direction with the use of highly anisotropic accelerated Ar ions.

After that, as shown in FIG. 15, it is possible to expose the soft magnetic film 43 by removing the mask material 51 remaining on the upper part of the main magnetic pole 22 by etching (reactive etching) of higher selectivity. In this embodiment, the carbon film having a rate ratio of 2 or more is used as the mask material 51. The carbon film is a suitable mask material for realizing this embodiment since it has etching resistance against the accelerated Ar ions and can be readily removed by reactive etching using oxygen ions.

The soft magnetic film 15 is deposited on all over a wafer in the state where the soft magnetic film is exposed on the upper part of the main magnetic pole by the above-described step. The soft magnetic film 15 has functions of the first soft magnetic film and the second soft magnetic film of the foregoing embodiments. More specifically, as is apparent form FIG. 15, since both sides of the main magnetic pole contact the soft magnetic film 15 via the non-magnetic film 24, it is possible to shield an unnecessary magnetic field spreading on opposite directions from the main magnetic pole. Also, since the upper part of the main magnetic pole has the non-magnetic film 42 having the function of the first non-magnetic film and connected to the soft magnetic film 15 used also as the shield on the trailing side via the soft magnetic film 43, it is possible to achieve a steep magnetic gradient on the trailing side.

A characteristic of this structure is that, since the difference in thickness in the process step is eliminated by previously depositing the non-magnetic film to be left on the trailing side of the main magnetic pole on the upper part of the main magnetic pole, it is possible to control the magnetic gradient on the trailing side in the remarkably stable manner. Particularly, under the condition of thinning the film thickness of the first non-magnetic film (condition of increasing the magnetic gradient), influences to be exerted by the film thickness on the recording magnetic field is great. In view of this object, this structure is suitable for realizing magnetic heads reduced in recording magnetic field difference otherwise caused by a production fluctuation.

Figure 14:
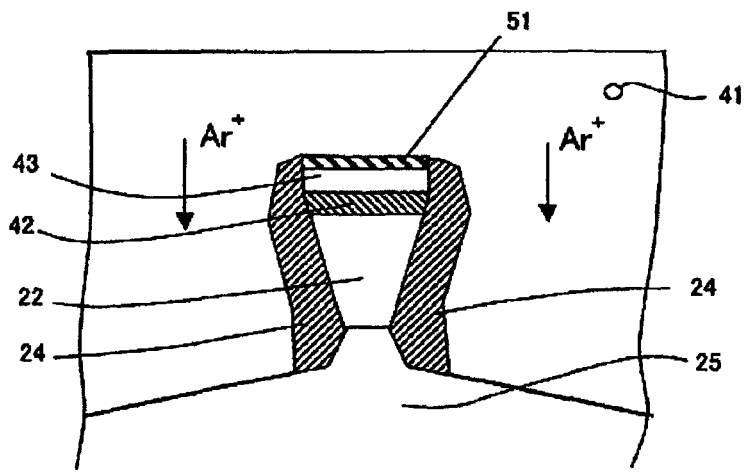
FIG. 14 is a diagram showing a production process of the magnetic head of Embodiment 3.

Alternatively, it is possible to realize a magnetic head that is functionally the same as that obtained by this structure by depositing the soft magnetic film 41 directly after achieving the state shown in FIG. 14, and then performing a planarizing processing using the mask material 51 or the soft magnetic film 43 as the termination point by CMP, followed by depositing the soft magnetic film.

The characteristic of the structure described above is the design of preventing the film thickness of the first non-magnetic film 42 from changing by previously forming the first non-magnetic film 42 on the upper part of the main magnetic pole, and it is needless to mention that it is possible to realize various structures by changing the order and the combination of process steps described in this invention.

However, any structure for bringing the flair of the main magnetic pole into contact with the soft magnetic film serving as the shield via the non-magnetic film by depositing the non-magnetic film simultaneously with the etching process step for deciding the flair of the main magnetic pole followed by depositing the soft magnetic film (any structure having the basic structure recited in claims) are encompassed by this invention.

Embodiment 4 of this invention is shown in FIGS. 16 to 18. Shown in FIG. 16 is a state achieved by: forming the first non-magnetic film 35, the soft magnetic film 24, and the mask material 51 on the main magnetic pole 22 in accordance with the foregoing embodiments; forming the flair by etching as shown in FIG. 9; and depositing the non-magnetic film 28 all over a wafer. In this state, the non-magnetic film 28 does not directly contact the main magnetic pole since the resist is stacked above the portion rear from the flair newly formed above the main magnetic pole. That is, the flair of the main magnetic pole and the rear end position of the non-magnetic film 28 substantially coincide with each other.

After that, as shown in FIG. 17, etching on the non-magnetic film 28 is performed in a planarizing manner by ion milling with the use of the mask material 51 as a termination point (monitoring a progress of etching by ion analysis and stopping the ion milling when a signal from the mask material 51 is detected) and with the use of the resist as the mask (this processing is called etch-back). Further, as shown in FIG. 18, the soft magnetic film 24 is exposed by selectively removing the mask material 51. Then, the soft magnetic film 21 is selectively formed by using the resist as the mask again. The soft magnetic film 21 has the function of the second soft magnetic film.

The flair point position and the rear end position of the soft magnetic film 21 in this embodiment coincide with each other at the region on which the mask material 51 is removed. This is realized by using the resist as the common mask material for the etching in a track width direction of the mask material 51 performed (the flair is formed) in the state where the rear end of the main magnetic pole is protected by the resist as well as for the deposition of the soft magnetic film 21 with the resist being remained.

As is apparent from FIGS. 16 to 18, the soft magnetic film does not exist on both sides of the main magnetic pole 22 in this embodiment. In this case, in order to reduce the magnetic field leaking to both sides of the main magnetic pole, it is necessary to keep the film thickness of the non-magnetic film 35 formed above the upper part of the main magnetic pole remarkably thin. That is, a peak position of an effective magnetic field strength is positioned on the upper part of the main magnetic pole by increasing an amount of the magnetic flux flowing from the main magnetic pole 22 to the soft magnetic film 21. More specifically, the thickness of the non-magnetic film 35 is controlled to the thickness that is less than a magnetic distance between the underlayer soft magnetic film existing below the recording medium and the main magnetic pole.

Though the structure of depositing the non-magnetic film 35 and the soft magnetic film 24 previously on the upper part of the main magnetic pole is described in this embodiment, it is beyond question that it is possible to practice this invention by employing a structure in which the soft magnetic film 24 is eliminated or a state in which the non-magnetic film 35 and the soft magnetic film 24 are eliminated. More specifically, the important point is that the rear end of the main magnetic pole substantially coincides with the flair position by performing the flair formation in the state where the rear end of the main magnetic pole is masked and sequentially depositing the non-magnetic film and the soft magnetic film required for realizing the structures or for performing the process steps in the state where the mask is remained.

The relationship between the flair position and the rear end position of the soft magnetic film disposed close to the main magnetic pole via the non-magnetic film is an important parameter for deciding the recording magnetic field quality, and magnetic heads of a considerably high productivity are realized by this invention since this invention enables to decide the parameter with the use of the common pattern.

Figure 5:
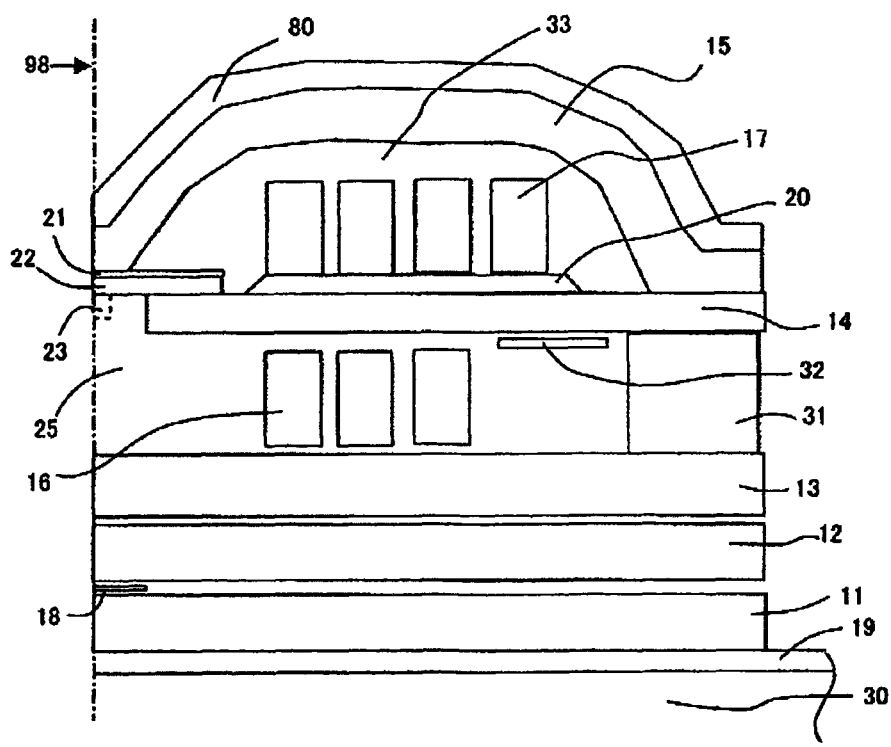
FIG. 5 A conceptual diagram showing a section of a magnetic head of Embodiment 5.

Embodiment 5 will be described by using FIG. 5. In this invention, rear end positions of a non-magnetic film and a soft magnetic film formed by using a common mask material coincide with each other. This flair position is decided by using a resist provided on a rear end of a magnetic pole as the mask. The position of the pattern is decided by using a light exposure device used in a semiconductor production apparatus. Therefore, the accuracy depends on accuracy of the light exposure device.

Accuracy of commercially available light exposure devices is about $3\sigma=20$ nm. Therefore, an operational setting limit (device design limit) of the flair point is $70\pm50$ nm in view of etching accuracy and the like. It is possible to increase strength of the magnetic field by reducing the length of the flair point; however, it is inevitable to set a flair point that is longer than the setting limit for producing magnetic heads on commercial basis. In the case of setting the long flair point, a further reduction in magnetic field is caused by the structure of substantially coinciding the rear end position of the soft magnetic film and the flair position described in this invention, and it is necessary to practice the following countermeasure in order to compensate for the reduction.

The coils 17 and 16 are formed as two layers to reinforce a magnetomotive force. In order to reduce a magnetic field leaked from the coils due to the reinforcement of the magnetomotive force, the main magnetic pole 22 is sandwiched between the coils 16 and 17 and the auxiliary magnetic poles 15 and 13 are provided on both sides of the main magnetic pole 22. A high magnetic field gradient is realized by disposing the non-magnetic film 21 between the auxiliary magnetic pole 15 and the main magnetic pole 22 and bringing the magnetic films closer to each other. The auxiliary magnetic pole 13 has another function of a shield for reducing an unnecessary magnetic field exerted by the coils on the reproducing shield 12 (which is realized by increasing the thickness or magnetically disconnecting from the soft magnetic film 14). The main magnetic pole 22 is connected to the soft magnetic film 14 which is magnetically coupled to the auxiliary magnetic pole 15. This is effective for achieving a steeper magnetic field gradient. More specifically, by increasing the film thickness of the soft magnetic film 14, it is possible to induce a larger amount of magnetic flux from the sub magnetic pole 15 to the main magnetic pole 22, and an effect of concentrating the magnetic flux is achieved by thinning the tip portion of the main magnetic pole 22.

The basic structure described above is substantially the same as the structure shown in FIG. 1. The recording unit is formed of the three layers of thick soft magnetic films and two layers of coils. Person skilled in the art who knows the in-plane recording head will easily understand that deformation caused by the ambient temperature is large in such structure (high in the film thickness direction). In order to prevent the deformation, a film 80 having a linear expansion coefficient smaller than that of the sub magnetic pole 15 serving also as the second soft magnetic film is stacked above the sub magnetic pole 15 in this invention. More specifically, a tungsten alloy is sequentially plated when forming the sub magnetic pole 15. Also, in order to efficiently diffusing the heat involved in a magnetism loss of the soft magnetic film 14, the non-magnetic film 31 is provided between the soft magnetic film 14 and the sub magnetic pole 13. Though it is acceptable to replace the non-magnetic film 31 with a magnetic film in practicing this invention, it is desirable to use the non-magnetic film in view of influences of the strong magnetomotive force exerted on the reproduction system.

Also, a resistive element 32 serving as a heat generation source is provided for the purpose of compensating for a loss difference between the write operation and the read operation. It is possible to adjust a distance (flying height) between the air bearing surface of the head and the medium by supplying electricity to the resistive element. It is desirable to use a high melting point material such as tungsten for the resistive element 32. Also, connection to the energy supply unit is provided by a wiring (wiring in the element, wiring on the suspension on which the head is mounted) in order to operate the function unit, and the operations of the function unit and the energy supply unit are controlled by the circuit 6. It is also possible to increase the film thickness of the coil as compared to the structure shown in FIG. 1 by providing a unit for suppressing and compensating for the heat deformation.

This embodiment fully solves problems accompanying the magnetic field strength insufficiency caused by the structure for deciding the flair position and the rear end position of the soft magnetic film disposed close to the main magnetic pole via the non-magnetic film by using the common pattern disclosed in the invention. By the inclusion of this structure, it is possible to realize magnetic heads capable of generating a strong magnetic field at high productivity.

What is claimed is:

1. A magnetic head comprising:
a main magnetic pole having a first section having a first substantially constant width, a second section having a second substantially constant width, and a third section having a third substantially constant width, a fourth section having a tapered width that extends from the first section to the second section, and a fifth section having a tapered width that extends from the second section to the third section;
a sub magnetic pole;
a first coil conductor formed between a layer on which the main magnetic pole is formed and a layer on which the sub magnetic pole is formed; and
a first magnetic film disposed on side faces of the main magnetic pole via a first non-magnetic film, wherein a first distance between an air bearing surface and the second section is larger than a second distance between the air bearing surface and the first section, the first non-magnetic film is formed along the first section; and a second magnetic film disposed on a trailing side of the main magnetic pole and magnetically coupled to the first magnetic film; and a second non-magnetic film formed between the main magnetic pole and the second magnetic film wherein the second non-magnetic film does not contact a second coil conductor formed between a third magnetic film and the second magnetic film, and wherein a distance in a depth direction from the air bearing surface to a region in which the second non-magnetic film and the second magnetic film contact is larger than a thickness in the depth direction of the first magnetic film.

2. The magnetic head according to claim 1, wherein a top face of the second non-magnetic film and a top face of the first magnetic film is formed into a same surface which is flattened.

3. The magnetic head according to claim 1, wherein a top face of the main magnetic pole and a top face of the first magnetic film is formed into a same flattened surface.

4. The magnetic head according to claim 1, further comprising:

the third magnetic film magnetically coupled to the main magnetic pole and having a film thickness larger than a film thickness of the main magnetic pole, wherein the third magnetic film is formed at a position recessed from the air bearing surface, and the second magnetic film is coupled to the third magnetic film.

5. The magnetic head according to claim 4, wherein the second coil conductor is disposed outside a closed magnetic path enclosing the first coil conductor, and the first coil conductor and the second coil conductor are serially coupled to a common power source.

6. The magnetic head according to claim 4, wherein a pitch of the second coil conductor is narrower than a pitch of the first coil conductor.

7. The magnetic head according to claim 5, wherein a film thickness of the second coil conductor is larger than a film thickness of the first coil conductor.

8. The magnetic head according to claim 4, further comprising:

a resistive element for adjusting a flying height of the magnetic head, the resistive element being disposed between the sub magnetic pole and the third magnetic film.

* * * * *